(12) United States Patent
Diester et al.

(10) Patent No.: US 10,148,524 B2
(45) Date of Patent: Dec. 4, 2018

(54) VISUALLY MODELING SCREEN-FLOWS IN COMPONENT-ORIENTED WEB-BASED SYSTEM

(71) Applicant: International Business Machines Corporation, Armonk, NY (US)

(72) Inventors: Matthias Diester, Stuttgart (DE); Timotheus Giuliani, Sindelfingen (DE); Andreas Nauerz, Stuttgart (DE); Thomas Steinheber, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 755 days.

(21) Appl. No.: 14/514,503

(22) Filed: Oct. 15, 2014

(65) Prior Publication Data

US 2015/0143247 A1 May 21, 2015

(30) Foreign Application Priority Data

Nov. 20, 2013 (GB) .................................. 1320454.0

(51) Int. Cl.
*H04L 12/24* (2006.01)
*G06F 3/0482* (2013.01)
*G06F 8/34* (2018.01)
*G06F 3/0486* (2013.01)
*G06F 3/0484* (2013.01)

(52) U.S. Cl.
CPC ............ *H04L 41/22* (2013.01); *G06F 3/0482* (2013.01); *G06F 3/0486* (2013.01); *G06F 3/04842* (2013.01); *G06F 8/34* (2013.01); *G06F 2203/04803* (2013.01)

(58) Field of Classification Search
CPC .............................. G06F 3/0482; H04L 41/22
See application file for complete search history.

(56) References Cited

U.S. PATENT DOCUMENTS

| | | | |
|---|---|---|---|
| 6,055,369 A | 4/2000 | Sawahata et al. | |
| 8,015,541 B1 | 9/2011 | Srinivasan et al. | |
| 8,271,541 B2 | 9/2012 | Mohan et al. | |
| 2003/0167315 A1* | 9/2003 | Chowdhry | G06F 17/30873 709/218 |
| 2004/0183831 A1* | 9/2004 | Ritchy | G06F 8/38 715/762 |
| 2007/0006069 A1* | 1/2007 | Smith | G06F 17/3089 715/201 |
| 2007/0089047 A1 | 4/2007 | Joshi | |
| 2009/0007021 A1 | 1/2009 | Hayton | |
| 2009/0007062 A1 | 1/2009 | Gilboa | |
| 2013/0152021 A1* | 6/2013 | Hatfield | G06Q 10/0633 715/843 |

* cited by examiner

*Primary Examiner* — Sherrod Keaton
(74) *Attorney, Agent, or Firm* — Cantor Colburn LLP; Robert Bunker

(57) ABSTRACT

A method includes selecting portal resources of a portal system within a graphical modeling tool. Data fields of the selected portal resources are mapped to each other using the graphical modeling tool to generate an execution flow path of the selected portal resources. The execution flow path is stored as a portal resource in the portal system.

15 Claims, 10 Drawing Sheets

VISUALLY MODELING SCREEN-FLOWS IN COMPONENT-ORIENTED WEB-BASED SYSTEM

FOREIGN PRIORITY

This application claims priority to United Kingdom Patent Application No. 1320454.0, filed 20 Nov. 2013, and all the benefits accruing therefrom under 35 U.S.C. § 119, the contents of which in its entirety are herein incorporated by reference.

BACKGROUND

Embodiments relate generally to a method for visually modeling screen-flows. Embodiments relate further to a portal application development system, a computing system, a data processing program, and a computer program product.

Customers often have to implement portal/portlet based solutions that guide users through a well-defined sequence of screens. These sequences route users along paths which interconnect user interface (UI) artifacts (forms, masks, etc.) that, altogether, allow them to easily accomplish particular tasks. From a user perspective, stepping through such sequences feels like navigating with wizards. It relieves users from thinking about the right order of navigation and processing of screens.

The need for such solutions arises across all vertical industries. E.g., in the insurance sector, screen-flow modelers might need to model flows for processing policy quotes or claim submissions. In particular, quoting a vehicle insurance policy may be comprised of steps like vehicle selection, vehicle data specification, insurance data collection, tariff characteristics selection, and so forth. Similar applications can be thought of when thinking of banking, help desks, or travel booking applications.

When developing portal based solutions, screens (in other words functions) are usually provided by portlets. But the mapping of individual screens to portlets is often not trivial since it has impact on both user experience as well as reusability.

Users have typically had to pick between two extremes. On the one hand, they can decide to let one single portlet provide all necessary screens (and thus, the entire set of functions needed to accomplish a particular task). On the other hand, they can decide to develop one dedicated portlet for each of these screens and thus, for each single function required to accomplish a particular task. The "one portlet fits all" approach implies developing one single monolithic application which is, due to its complexity, hard to maintain, poorly scalable and, due to its non-modular character, difficult to reuse. However, this approach provides developers and screen-flow modelers with the highest control for guiding users through the flow. In contrast, the "one portlet per screen"-approach offers much higher flexibility and increases options for reusability tremendously. Hence, guiding users becomes less strict and less controllable which may increase the danger of erroneous navigation. Hence, either developers have to "hard-wire" portlets which may reduce flexibility or, users have to find out about the intended flow which may increase the risk for incorrect usage. In general, there is no single right answer for the "right" granularity which often leads to time consuming discussions and decisions depending on the actual scenario to be implemented.

There are several approaches for developing portal based workflows. Document US 2013/0152021 A1 discloses a method for providing workflow stages and integrated workflow stage visualization including displaying a detailed view of a workflow. The workflow may include a plurality of customizable stages. At least a first workflow stage is configured to contain a plurality of customizable workflow components and displaying them in a detailed view. Then, a selection of a stage view within the workflow may be received.

Document U.S. Pat. No. 8,271,541 B2 discloses a method for developing composite applications. A model architecture component can model a business rule utilizing at least one node in a hierarchical structure. A runtime engine can automatically create a complex, long running composite application based at least in part upon the hierarchical node structure such that the representative process segments of the application are involved by the business rule.

SUMMARY

Embodiments relate to methods, systems, computer program products, or apparatuses for visually modeling screen-flows.

According to an embodiment, a method includes selecting portal resources of a portal system within a graphical modeling tool. Data fields of the selected portal resources are mapped to each other using the graphical modeling tool to generate an execution flow path of the selected portal resources. The execution flow path is stored as a portal resource in the portal system.

According to another embodiment, a system includes a processing unit and a memory. The system is configured to select portal resources of a portal system within a graphical modeling tool. Data fields of the selected portal resources are mapped to each other using the graphical modeling tool to generate an execution flow path of the selected portal resources. The execution flow path is stored as a portal resource in the portal system.

According to another embodiment, a computer program product includes a computer readable storage medium having program instructions embodied therewith. The computer readable storage medium is not a transitory signal per se and the program instructions are executable by a processor to cause the processor to perform a method. The method includes selecting portal resources of a portal system within a graphical modeling tool. Data fields of the selected portal resources are mapped to each other using the graphical modeling tool to generate an execution flow path of the selected portal resources. The execution flow path is stored as a portal resource in the portal system.

BRIEF DESCRIPTION OF THE SEVERAL VIEWS OF THE DRAWINGS

Embodiments of the invention will now be described, by way of example only, and with reference to the following drawings.

DETAILED DESCRIPTION

Figure 1:
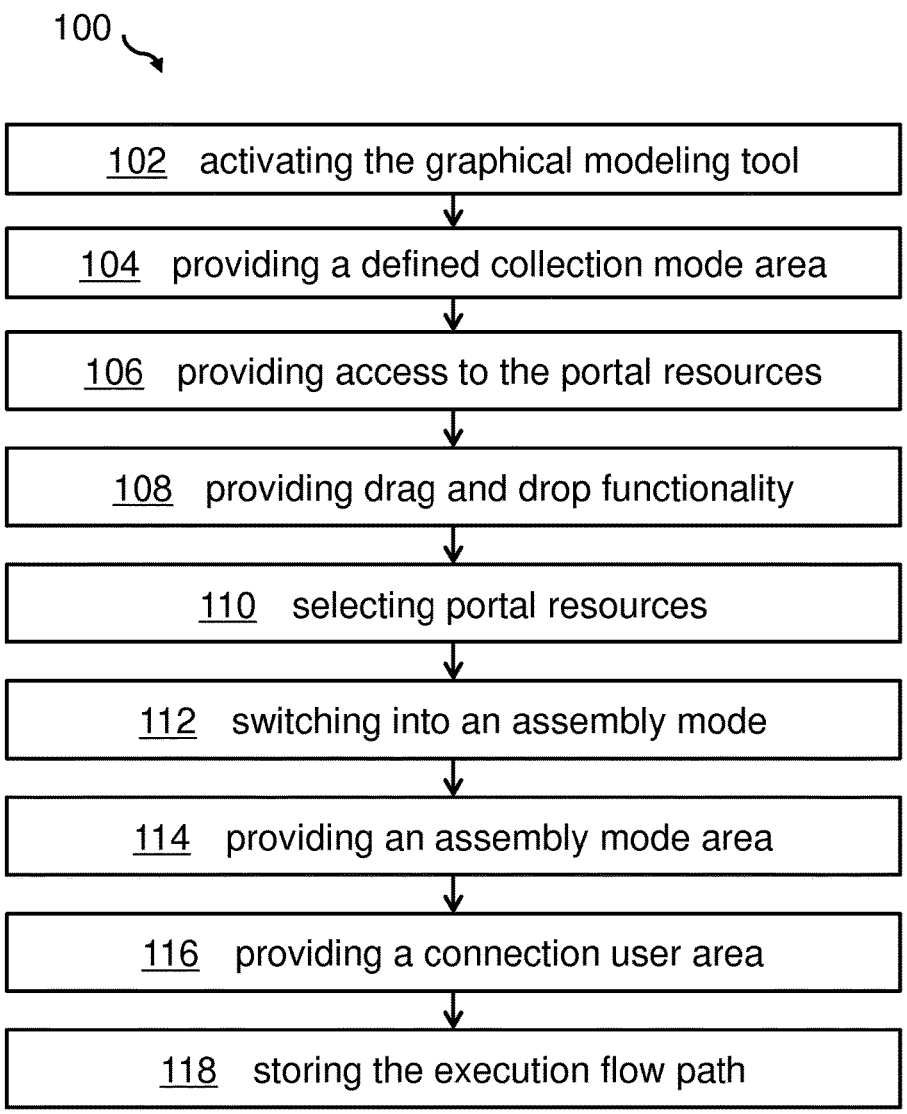
FIG. 1 shows an overview block diagram of an embodiment.

In the context of this description, the following conventions, terms and/or expressions may be used:

It may be noted that "side-by-side" may be an expression meaning "on the same screen" or in the same window. It may say nothing about the layout of the screen. One window or portlet may be above another one. However, side-by-side may express more a time-wise dependency. A user may recognize both elements displayed side-by-side at the same time. The user may also use the elements without limitations.

It may be noted that the immediate use, usability or, execute-ability of an execution flow path of portal resources may apply to the administrative user who may still be using the portal application development system or, any other user having access to the port of system.

"Providing access to the portal resources" may mean that an administrator user may have access to data components or resources, in particular portal resources. This may apply directly to all portal resources of the Web navigational user interface.

The term "visually modeling screen-flows" may denote the capability of editing a sequence of different views of portal resources rendered in a portal of a portal system. Different views may be chained into an execution flow path. Such an editing may be supported electronically such that the different screens may be visible and manipulative using graphical tools.

The term "portal resources" may denote any displayable content, input form or, displayable computing result. The resources may typically be handled as portlets of a portal system. The data for content to be displayed in a portal may originate from any application or data source. Besides portlets, also complete portal pages may be treated as a resource. Portlets may be seen as pluggable user interface software components which are managed and displayed in a Web portal. The portlets may produce fragments of mark-up language code—e.g., HTML, XHTML, WMF—which may be aggregated into a portal system. A portal page may be displayed as a collection of non-overlapping portlet windows displayed as portlets.

The term "portal system" may denote a plurality of components allowing a user to navigate in a graphical user interface by a pointing device, a management of portal pages and portlets, and in particular, a back-end administration system to manage pages, content, screen-flows, access control as well as a database to store related information items.

The term "execution flow path" may denote a sequence of displayed and/or navigable views within a portal system. The sequence may be predefined.

The term "portal page" may denote the completeness of information windows displayed within a portal system user interface.

The term "portlet" may denote a pluggable user interface software component which may be managed and displayed in a Web portal which has already been defined above in the context of portal resources.

The term "connectable" may denote the feature to link original separate views or screens into a linked or connected flow of the different views or portal resources. Thus, if portal resources may be connected to each other in an execution flow path they may be accessible one after the other automatically in the right sequence.

The term "graphical modeling tool" may denote—in this context—a component of a graphical user interface allowing developing an execution flow path combining a plurality of portal resources.

The term "Web navigational user interface" may denote the general concept of a Web browser. It may allow users to navigate within a displayed Web page using a pointing device, wherein in the displayed Web page may comprise the rendered output of a portal (back-end) system.

The term "portal resources to be collected" may denote portal resources which may be eligible to be connected in an execution flow path. The portal resources to be collected may be visible within the Web navigational user interface. Consequently, they may be selectable using the pointing device. This may be a prerequisite to manage the portal resources with a drag-and-drop functionality. Thereby, the drag-and-drop functionality may comprise a pointing device gesture in which a user may selects a virtual object by "grabbing" it and dragging it to a different location or onto another virtual object.

Embodiments for visually modeling screen-flows and the related system may offer a couple of advantages:

Using a tool related to the proposed method, a developer, e.g., an administrator user may stay within active portal resources when developing a portal application. I.e., he may have full access to all resources of a given portal and may, in addition, have access to one or more portlet development tools for combining innovatively the portal resources—i.e., portal pages and/or portlets—into a new execution flow path of portal resources. This means that the administrator user may navigate through existing portals and portlets while at the same time having access to a portal development tool. No special development environment, separate to the available portal resources, may have to be launched.

Traditional Web development environments typically require a special development view onto the available resources. In such a mode, navigation within and between the portal resources may not be possible. Thus, in such a traditional mode there may be a disconnection between the available resources during development time.

In contrast to this, embodiments may allow an in-line development, wherein both, the developmental environment and the portal resources may be accessible and fully navigable. Thus, the administrator user may have full control of all portal resources in a user mode also during development time.

At the end of a development cycle, an execution flow path may be available for immediate use by the administrator user for an immediate test. This way, the administrator user may not have to leave the developmental environment for a test of the developed portal application. Alternatively, the execution flow path may also immediately be available for a test user or regular user. This way, prototyping of new Web applications may be more productive if compared to the traditional method.

According to one embodiment, the last navigated resource which has been activated before the graphical modeling tool may have been activated, may continue to stay active. This way, the graphical modeling tool for developing new Web applications, i.e., a new execution flow path, and the available resources, i.e., portal pages and/or portlets, may be active at the same time with full control by the administrator user.

Further embodiments may comprise providing search functionality in an administrator selection user interface for portal resources. This feature may allow searching for specific portal pages or portlets within the pool of available resources. This way, it may not be required to search manually for specific resources. The speed of development may be increased.

According to an additional embodiment, icons of portal resources may be selectable within the administrator selection user interface. They may also be draggable into the defined collation mode area. Using this feature, an administrator user or developer may not be required to navigate through all available resources for developing a new Web application. Instead, he may only pick and choose—i.e., drag-and-drop—available portal resources into the defined collection mode area. Again, this may speed up the development process.

According to an embodiment, beside the search functionality and the icons of portal resources also the last navigated resource, which may have been activated by the administrator user, may continue to stay active. This may happen in parallel and side-by-side to an activation of the graphical modeling tool side by side with the defined collection mode area. Thus, the active resource(s) as well as the graphical modeling tool, i.e., the collection mode, may be active on the same screen, i.e., the same Web navigational user interface. Thus, an administrator user may have full control of all resources and related applications in addition to the portal application development system because also the portal application development system may be treated as a resource within the same portal system.

This means that a navigation and interaction with the portal resources may continue to be activated even if the graphical modeling tool has been activated. Thus, new portal applications may be developed very intuitively and in short time frames.

According to one embodiment, the mapping of selected data fields of the selected and connected portal resources may be performed using the drag-and-drop functionality. This way, variables which a user may have typed in a portal or portlet form may be transferable from one portlet to another portlet, i.e., from output fields to input fields. The dragging and dropping of related fields of different and/or successive portlets may enhance the development speed of new Web applications. Automatic data field format tests may be included in this drag-and-drop functionality in order to avoid format mismatches. This may be an additional guiding help for the administrator user.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

In the following, a detailed description of the figures will be given. All instructions in the figures are schematic. Firstly, a block diagram and handling diagrams of an embodiment of a method for visually modeling screen-flows is given. Afterwards, further embodiments of the portal application development system will be described.

FIG. 1 shows an overview block diagram of an embodiment of a method 100 for visually modeling screen-flows by connecting portal resources 212 of a portal system 1000 for creating an execution flow path for immediate use, in particular, during runtime of the portal system 1000 by a user.

The portal resources 212 are portal pages 1016 and portlets 1018, which are selectively connectable using a graphical modeling tool 206. The graphical modeling tool 206 is driven by a graphical modeling tool module 1006 and is integrated as one of the portal resources 212 and accessible via a related Web navigational user interface 200 of the portal system 1000. The method 100 comprises activating, 102, the graphical modeling tool 206 resulting in a collection mode of the Web navigational user interface 200 which is characterized by providing, 104, a defined collection mode area 204 within the Web navigational user interface 200, side by side with the portal resources 212, to be collected. This means that the defined collection mode area may be rendered together with the last page the administrator user has navigated to and/or will be navigating successively in the portal system 1000. The collection mode may stay active independently of whereto the administrator user navigates.

The method 100 may also comprise providing, 106, access to the portal resources 212, in particular to its data, meta data and/or components, i.e., resources, within the Web navigational user interface 200.

There may also be a providing, 108, a drag-and-drop functionality within the Web navigational user interface 200 and a selecting, 110, portal resources 212 within the Web navigational user interface 200 to be connected. For this, the drag-functionality may be used and the selected portal resources 212 may then be dropped into the defined collection mode area 204 of the Web navigational user interface 200 using the drop-functionality.

The method 100 may also allow a switching, 112, into an assembly mode of the Web navigational user interface 200, which may be characterized by providing, 114, an assembly mode area 600, and providing, 116, a connection user interface 630. The selected portal resources 610, . . . , 624 may be connectable selectively using the connection user interface 630, and data fields of the selected and connected portal resources 610, . . . , 624 may be selectively mapped to each other for an immediate life navigation using a mapping user interface.

This mapping may either be performed by directly typed names or identifiers of corresponding fields of related, chained portal resources 610, . . . , 624 into an input field or, alternatively, by dragging source data fields of a portal page to an input data field of a successive portal page. The mapping may also be performed supported by metadata in that fields with identical metadata may be mapped automatically to each other.

This way, an execution flow path 1038 of the connected portal resources 610, . . . , 624 may be created, which may then be stored, 118, as a new portal resource 212 in the portal system 1000 for immediate use by either the administrator user for a direct test, by a tester or, by a normal user. Prototyping may become much more productive this way. And the prototypes may be transformed into a productive mode immediately.

Figure 2:
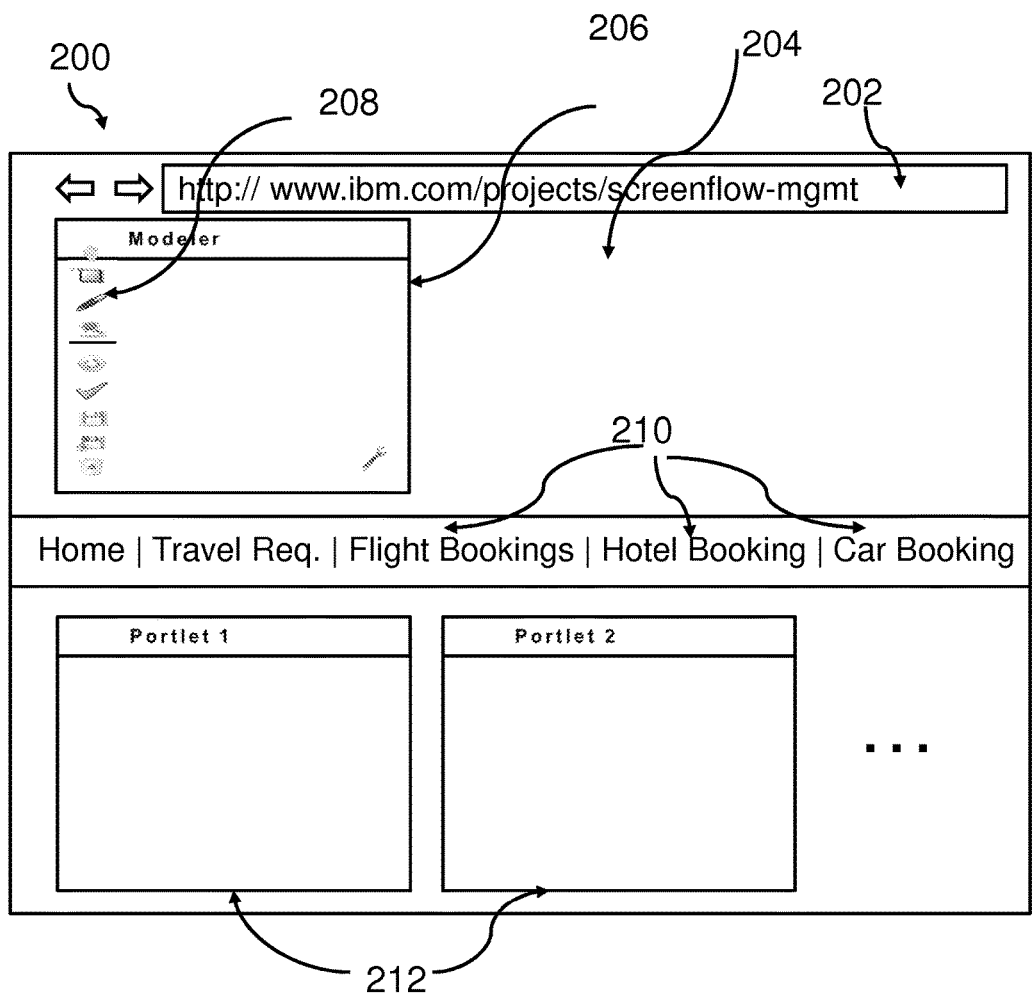
FIG. 2 shows an embodiment of a screen layout with a graphical modeling tool and portal resources.

FIG. 2 shows an embodiment of a screen layout with a graphical modeling tool and portal resources. A Web navigational user interface 200 may comprise navigational arrows (as shown on the top left side) and an input field 202 for a Web address, here, e.g., http://www.ibm.com/projects/screenflow-mgmt. In the bottom area of the Web navigational user interface 200 is a "normal" application (in the sense of an end user application and not a development tool) displayed. As an example, traveler flight, hotel, and car booking systems are used. Also different portal resources 212 in the form of portlets are shown. Moreover, application links 210 may be displayed as part of the booking systems.

In the top half of the Web navigational user interface 200 the graphical modeling tool 206 screen area may be displayed. It may comprise a tool bar 208 and the defined collection mode area 204. The graphic in the modeling tool 206 screen area may be resized as appropriate.

Figure 3:
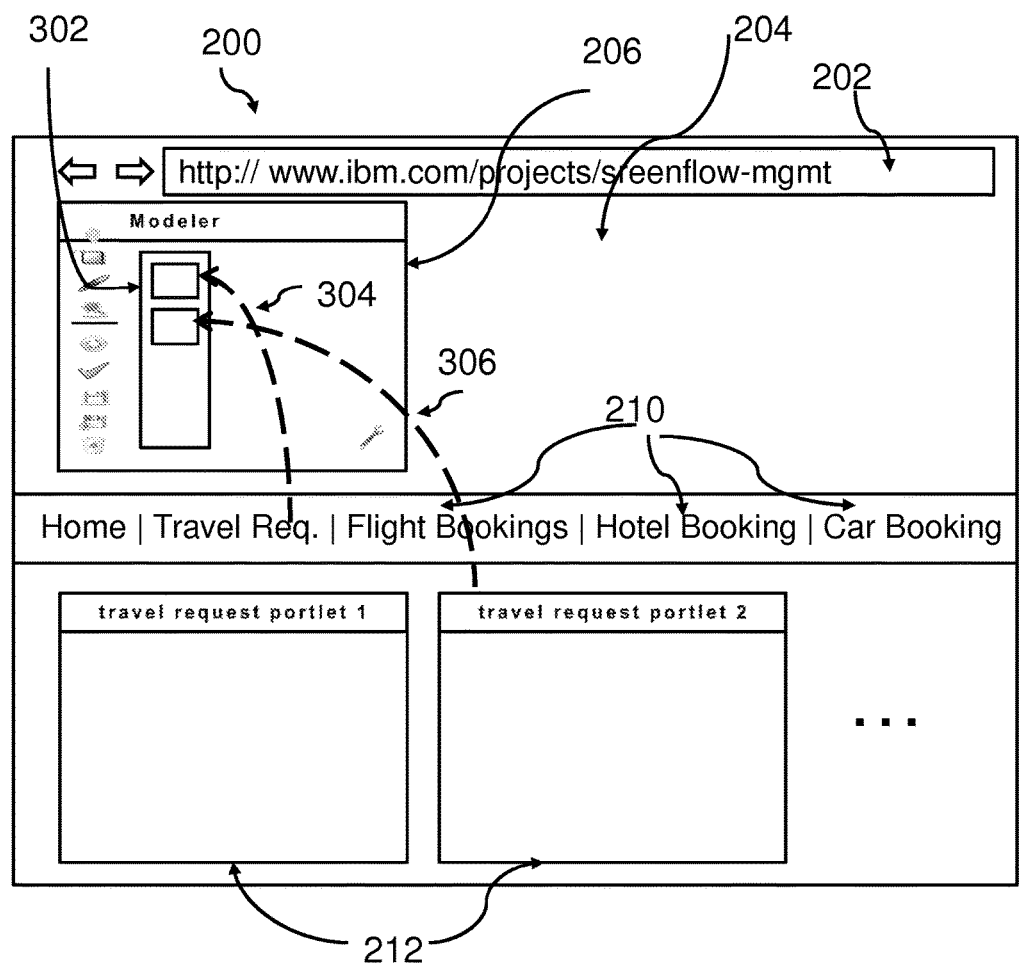
FIG. 3 shows an embodiment of how portal resources are collected in the defined collection mode area.

FIG. 3 shows an embodiment of how portal resources 212 are collected in the defined collection mode area 204. The graphical representation of the modeling tool screen area 206 may comprise one or more lanes 302 into which portal resources 212 or application links 210 may be dragged and dropped as illustrated by the arrows 304 and 306.

Figure 4:
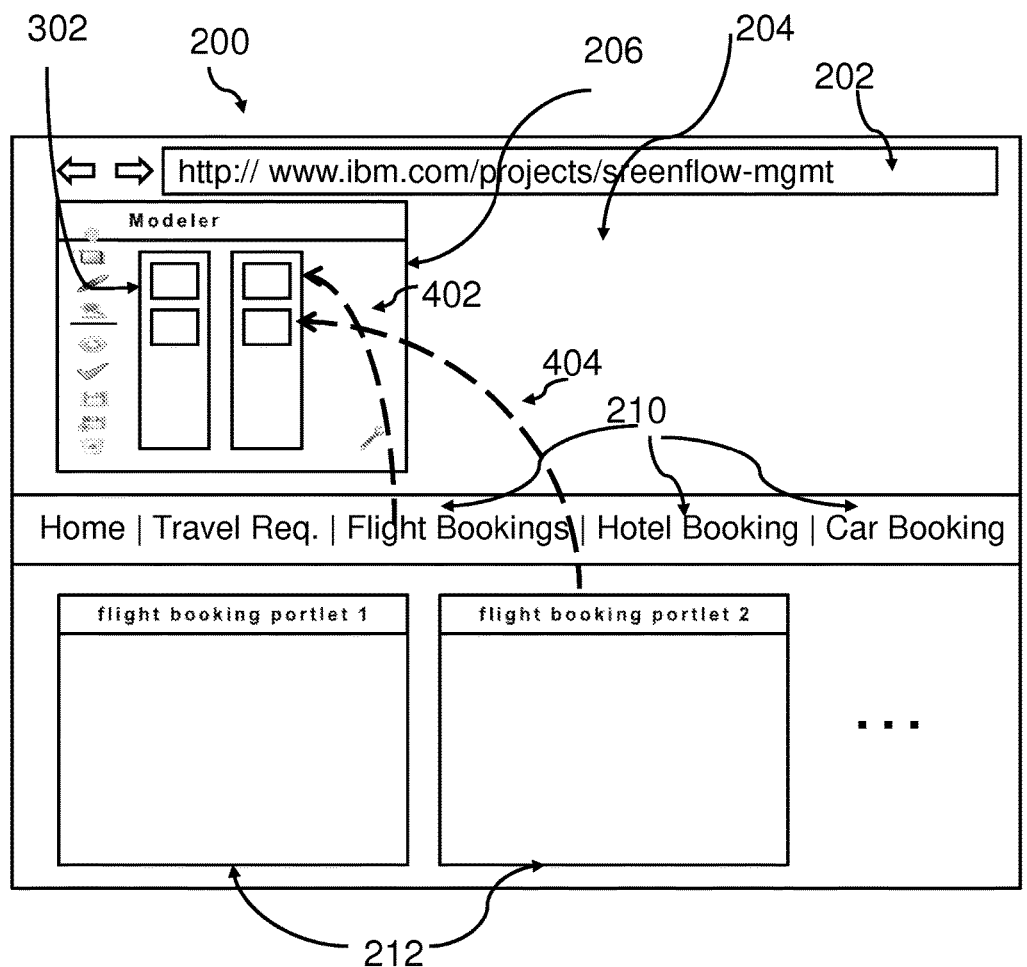
FIG. 4 shows another embodiment of how portal resources are collected in the defined collection mode area.

FIG. 4 shows another embodiment of how portal resources 212 are collected in the defined collection mode area 204. In this case, the second lane 302 besides the one already shown in FIG. 3 may comprise additional portal resources. Here, "flight bookings" and the "flight booking portal 2" are dragged and dropped from the bottom area of the Web navigational user interface 200 in the defined collection mode area 204 of the Web navigational user interface 200. This is shown by arrows 402 and 404.

Figure 5:
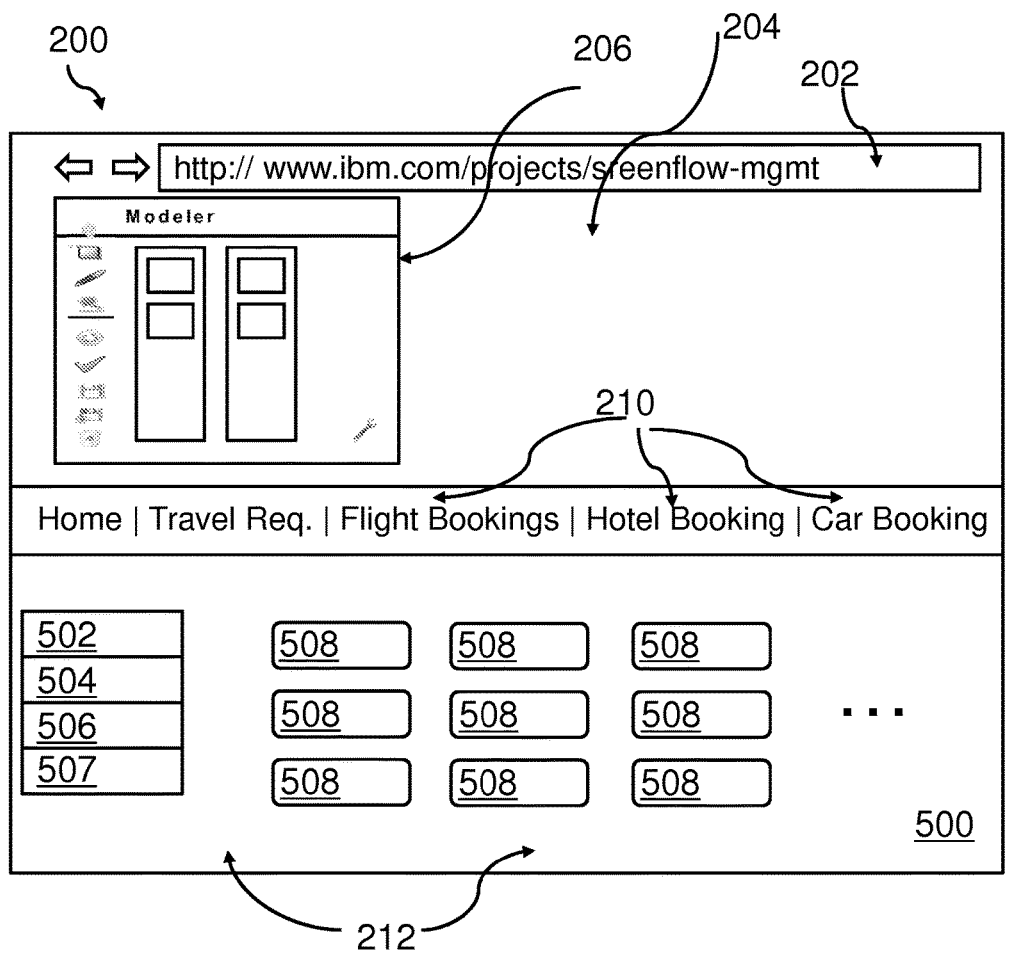
FIG. 5 shows an embodiment of how icons and a search function may be integrated into the user interface.

FIG. 5 shows an embodiment of how icons 508 and a search function 502 may be integrated into the Web navigational user interface 200. In this view, not the complete portlets as shown in the previous figures are displayed, but only icons 508 of these portlets in the area 500. They may be filtered by different menu functions 504 for "all portlet resources", 506 for "administrative portlets" or, 507 for "collaborative portlets", and so on. The view may not be as interactive as the firstly described version and may be better suited to both for a professional Web application developer. However, the proposed method may allow both modes of operation.

Figure 6:
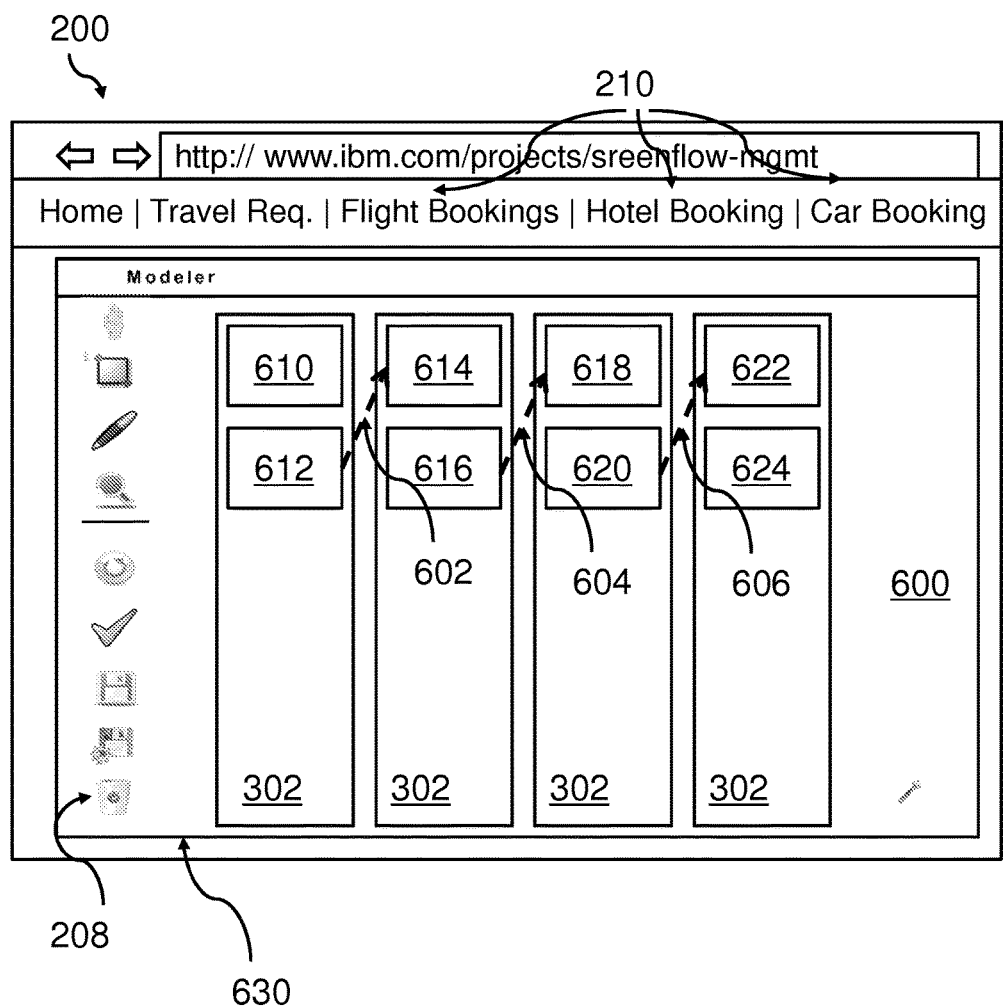
FIG. 6 shows an embodiment of a layout and function of the assembly mode.

FIG. 6 shows an embodiment of a layout and function of the assembly mode. Different lanes 302 are shown side-by-side in the portal. Portal resources 212 may no longer be visible. Instead, a connection user interface 630 together with a related tool bar 208 is shown. Included into the lanes 302 are already selected portal resources 610, . . . , 624. Reference numerals 610, 614, 618, and 622 may denote one of the application links 210 as introduced in FIG. 2. Reference numerals 612, 616, 620, 624 may denote related portlets. Using the connection user interface 630, portlets 612 may be linked to application 614 as shown by an arrow 602. Similarly, displayed portal resources 616 and 618—connected by an arrow 604—as well as 620 and 622—connected by arrow 606—may be linked or chained within the assembly mode area 600. In this view, also the application links 210 may be included.

This way, different portal resources of different and separate portal applications may be linked together within a graphical user interface providing an elegant and intuitive way to chain originally separated applications or application components into a new screen-flow or execution flow path.

Figure 7:
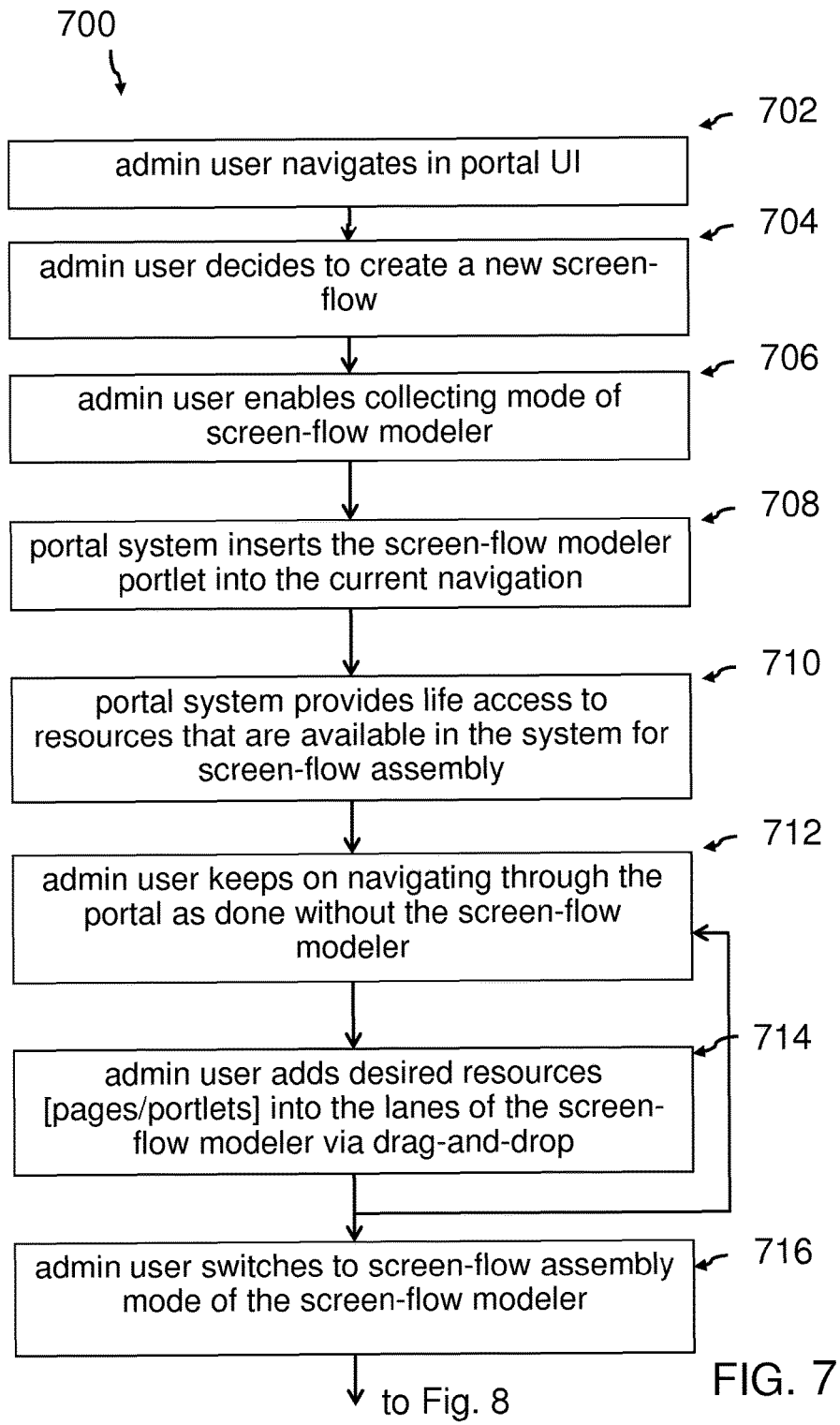
FIG. 7 shows the first part of a detailed block diagram of an embodiment.

FIG. 7 shows the first part of a detailed block diagram 700 of an embodiment of a method. 702, an administrator user may navigate into a portal user interface, i.e., the Web navigational user interface 200. Then, 704, the administrator user may decide to create a new screen-flow. The administrator user may enable, 706, the collection mode of the screen-flow modeler. At 708, the portal system may insert the screen-flow portlet into the current navigation view. The portal system 1000 may continue to provide, 710, live access to portal resources that are available in the portal system for a screen-flow assembly, as discussed in the context of FIGS. 2 to 6. At 712, the administrator user keeps on navigating through the Web navigational user interface as he would have done without the screen-flow modeler. In parallel, 714, the administrator user and may add the desired portal resources 212, i.e., portlets and pages to the lanes of the screen-flow modeler via drag-and-drop. This may be a recursive process. Afterwards, the administrator user may switch the portal application development system, shown as a computer 900 in FIG. 9, into the screen-flow assembly mode, 716.

Figure 8:
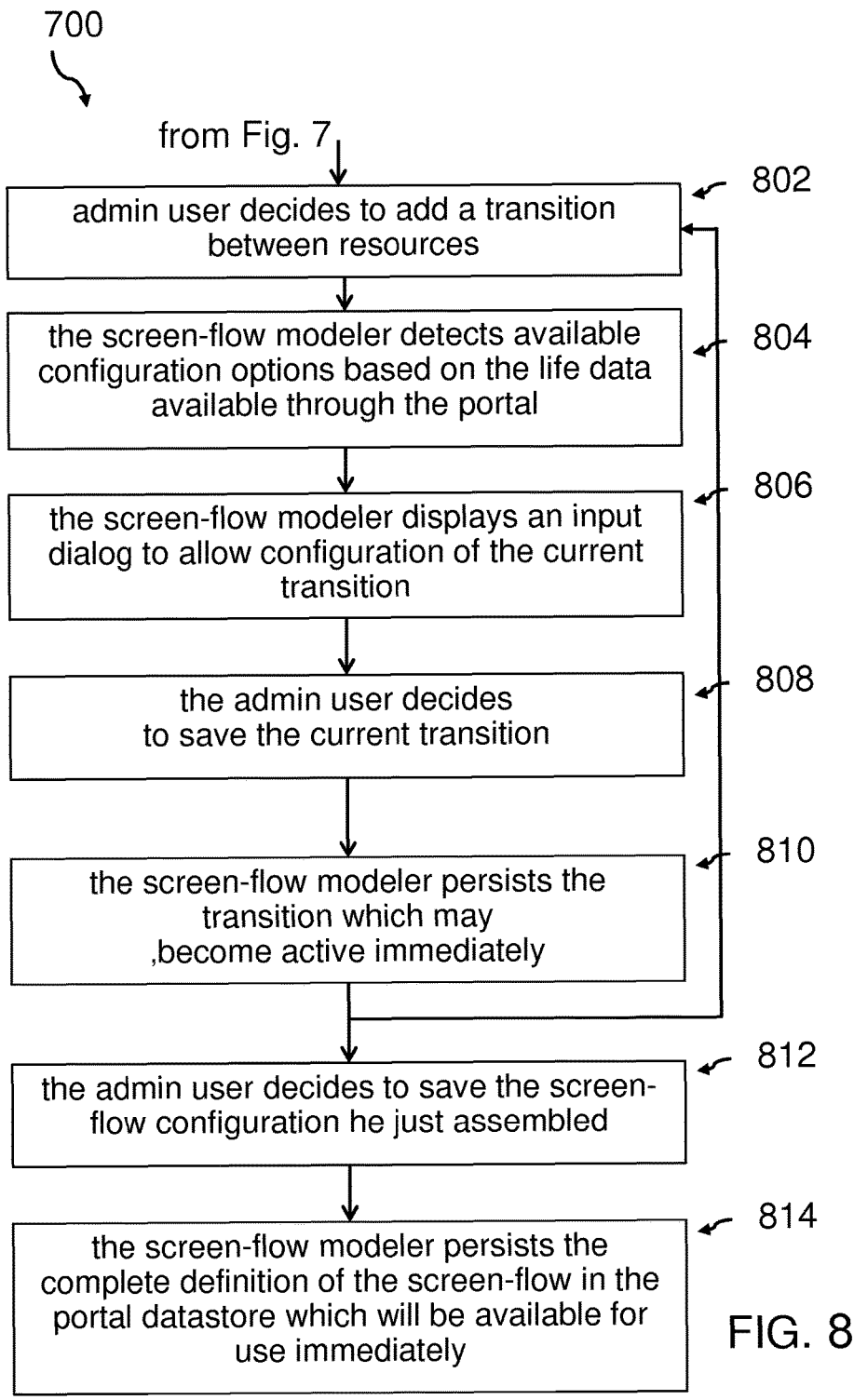
FIG. 8 shows the second part of a detailed block diagram of an embodiment.

FIG. 8 shows the second part of a detailed block diagram 700 of an embodiment of a method. At 802, the administrator user may decide that a transition between resources 610, . . . , 624, as discussed in the context of FIG. 6, may be performed. The screen-flow modeler may detect, 804, available configuration options based on the life data and metadata available through the portal system. This may, e.g., be applicable for input and output fields of a specific portal resource pair. At 806, the screen-flow modeler may display an input dialog to allow a configuration of the current transition including input and output fields of portlets 1016. A mapping of output fields to input fields of successive portlets 1016 or portal resources 212 may be performed by a drag-and-drop functionality. At 808, the administrator user may decide to save the current transition from one portlet to another, at which point, the screen-flow modeler may persist the transition in form of a portion of an execution flow path 1038 which may become active immediately for use, 810. After the complete execution flow path 1038 may have been created, the administrator user may decide to save the complete screen-flow or execution flow path 1038 he just assembled, 812. At 814, the screen-flow may store the complete definition of the screen-flow in the portal data store 1016.

Figure 10:
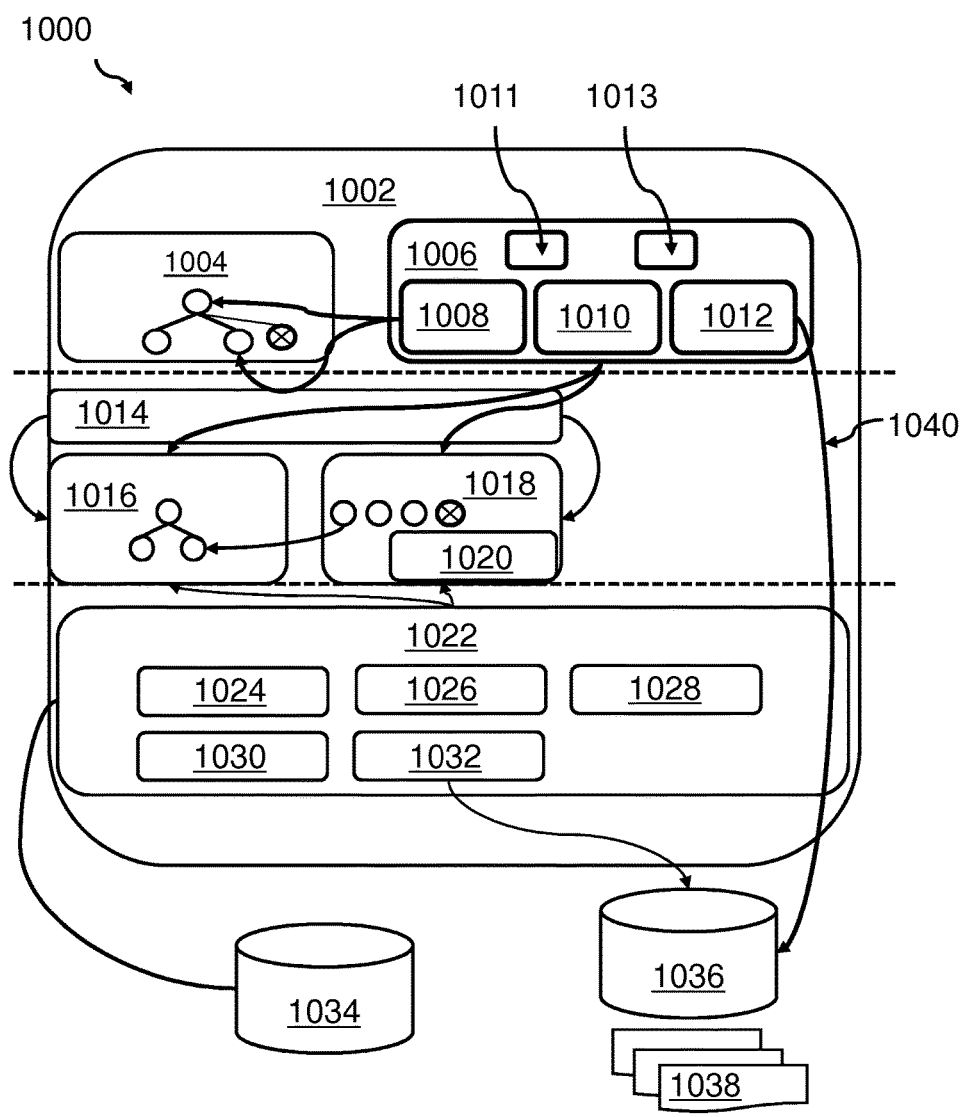
FIG. 10 shows a block diagram of an embodiment of a portal system with elements of the proposed expansion regarding visually modeling screen-flows in a component-oriented Web-based system.

FIG. 10 shows a block diagram of a portal system 1000 with elements of the proposed expansion regarding visually modeling screen-flows in a component-oriented Web-based system.

A traditional portal system 1000 may comprise a driver 1002 for a Web navigation user interface 200 module, portal pages 1016, portlets 1018 with communication endpoints 1020, a modeler API 1014 (application programming interface) and, some administration components 1022. These may comprise a page management component 1024, a deployment module 1026, a content management module 1028, an access control component 1030 and a screen-flow administration module 1032. Additionally, the portal system 1000 may comprise a portlet data store 1034 and an execution flow path data store 1036 in which individual screen-flows or execution flow path 1038 may be stored.

Also shown in FIG. 10 is an extension to the traditional portal system building a portal application development system 920. It may comprise a graphical modeling tool module 1006. It may comprise a couple of additional modules: a drag-and-drop module 1008 may be adapted for selecting portal resources 212, 610, . . . , 624, e.g., portlets 1018 or portal pages 1016 or data fields of portlets. The drag-and-drop module 1008 may also be adapted together with a collection user interface module 1010 to move portal resources 212 into the defined collection mode area 204, represented by reference numeral 1004 in FIG. 10, or to connect selected portal resources 610, . . . , 624 within the assembly mode area 600. The same drag-and-drop module 1008 may be used for selectively mapping input and output fields of portlets 1018 when connected to them.

A connection user interface module 1012 may be adapted for connecting selected portal resources 610, . . . , 624, as described above. This module may also be supported by the drag-and-drop module 1008. The assembled and connected screen-flow of execution flow path 1038 may be stored in the execution flow path data store 1036. This may also be performed by the screen-flow connection user interface module 1012 as shown in FIG. 10 by arrow 1040.

Figure 9:
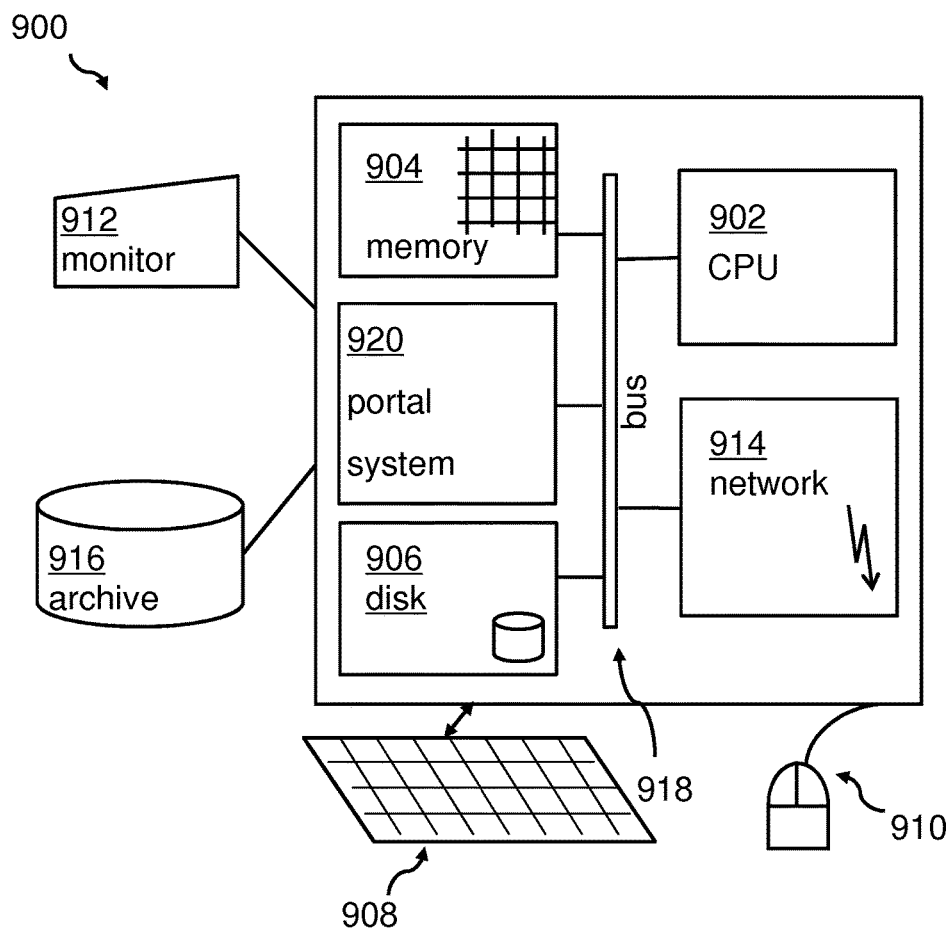
FIG. 9 shows a block diagram of an embodiment of a computer system including the portal application development system.

Embodiments of the invention may be implemented together with virtually any type of computer, regardless of the platform being suitable for storing and/or executing program code. For example, as shown in FIG. 9, a computing system may be a computer 900 including one or more processor(s) 902 with one or more cores per processor, associated memory elements 504, an internal storage device 506 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 904 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 916 for an execution. A disk 906 may be designated for longer-term storage, such as a non-volatile memory disk. Elements inside the computer 900 may be linked together by means of a bus system 918 with corresponding adapters. Additionally, the portal application development system 920 may be attached to the bus system 918. Storage elements of the portal system—e.g., 1034, 1036—and the computing system may be shared.

The computer 900 may also include input means, such as a keyboard 908, a pointing device such as a mouse 910, or a microphone (not shown). Alternatively, the computing system may be equipped with a touch sensitive screen as main input device. Furthermore, the computer 900, may include output means, such as a monitor or screen 912 [e.g., a liquid crystal display (LCD), a plasma display, a light emitting diode display (LED), or cathode ray tube (CRT) monitor]. The computer 900 may be connected to a network (e.g., a local area network (LAN), a wide area network (WAN), such as the Internet or any other similar type of network, including wireless networks via a network interface connection 914. This may allow a coupling to other computer systems or a storage network or a tape drive. Those, skilled in the art will appreciate that many different types of computer systems exist, and the aforementioned input and output means may take other forms. Generally speaking, the computer 900 may include at least the minimal processing, input and/or output means, necessary to practice embodiments of the invention.

Embodiments relate to methods, systems, computer program products, or apparatuses for visually modeling screen-flows.

According to one aspect, a method for visually modeling screen-flows is performed by connecting portal resources of a portal system for creating an execution flow path for immediate use. The method includes activating a graphical modeling tool to activate a collection mode of a Web navigational user interface. The graphical modeling tool is integrated as one of the portal resources and accessible via a related Web navigational user interface of the portal system. The collection mode includes a defined collection mode area within the Web navigational user interface side by side with the portal resources to-be-collected. The portal resources include portal pages and portlets, and the portal resources are connectable selectively using the graphical modeling tool. The collection mode provides access to the portal resources within the Web navigational user interface, and the collection mode provides drag-and-drop functionality. The method includes selecting portal resources within the Web navigational user interface. The portal resources to-be-collected are selected using the drag-and-drop functionality by dragging the portal resources and dropping the portal resources into the defined collection mode area of the Web navigational user interface. The method includes switching into an assembly mode of the Web navigational user interface. The assembly mode is characterized by providing an assembly mode area and providing a connection user interface. The selected portal resources are connectable selectively using the connection user interface. The data fields of the selected and connected portal resources are selectively mapped to each other for an immediate navigation, using a mapping user interface resulting in an execution flow path of the connected portal resources. The method further includes storing the execution flow path as a portal resource in the portal system for immediate use.

According to another aspect, a portal application development system includes memory and a processor for visually modeling screen-flows by connecting portal resources of a portal system for creating an execution flow path for immediate use. The system includes an activation unit adapted for activating a graphical modeling tool module driving a graphical modeling tool, in response to an activation signal, resulting in a collection mode of a Web navigational user interface. The collection mode is configured to provide a defined collection mode area within the Web navigational user interface side by side with portal resources to be collected. The portal resources are portal pages and portlets, and the portal resources are connectable by means of using a graphical modeling tool. The graphical modeling tool is integrated as one of the portal resources and is accessible via a related Web navigational user interface driven by user interface module of the portal system. The collection mode is further configured to provide access to the portal resources within the Web navigational user interface. The system includes a drag-and-drop module for selecting portal resources within the Web navigational user interface. The portal resources to be collected using a drag functionality of the drag-and-drop module and adapted for dropping them into the defined collection mode area of the Web navigational user interface using a drop-functionality of the drag-and-drop module. The system includes a collection user interface module adapted for collecting selected portal resources in the defined collection mode area. The system includes a switching unit adapted for switching the graphical modeling tool module, in response to an assembly mode switching signal, into an assembly mode for the Web navigational user interface. The system includes a connection user interface module. The selected portal resources are connected by means of the connection user interface module within an assembly mode area. The data fields of the selected and connected portal resources are selectively mapped to each other for an immediate life navigation using a mapping user interface module resulting in an execution flow path of the connected portal resources. The system includes a storage module adapted for storing the execution flow path as a portal resource in the portal system for immediate use.

According to another aspect, a computer program product for visually modeling screen-flows by connecting portal resources of a portal system for creating an execution flow path for immediate use includes a computer readable storage medium having program instructions embodied therewith. The computer readable storage medium is not a transitory signal per se. The program instructions are executable by a processor to cause the processor to perform a method. The method includes activating a graphical modeling tool to activate a collection mode of a Web navigational user interface. The graphical modeling tool is integrated as one of the portal resources and accessible via a related Web navigational user interface of the portal system. The collection mode includes a defined collection mode area within the Web navigational user interface side by side with the portal resources to-be-collected. The portal resources include portal pages and portlets, and the portal resources are connectable selectively using the graphical modeling tool. The collection mode provides access to the portal resources within the Web navigational user interface, and the collection mode provides drag-and-drop functionality. The method includes selecting portal resources within the Web navigational user interface. The portal resources to-be-collected are selected using the drag-and-drop functionality by dragging the portal resources and dropping the portal resources into the defined collection mode area of the Web navigational user interface. The method includes switching into an assembly mode of the Web navigational user interface. The assembly mode is characterized by providing an assembly mode area and providing a connection user interface. The selected portal resources are connectable selectively using the connection user interface. The data fields of the selected and connected portal resources are selectively mapped to each other for an immediate life navigation, using a mapping user interface resulting in an execution flow path of the connected portal resources. The method further includes storing the execution flow path as a portal resource in the portal system for immediate use.

The portal application development system may also comprise a providing unit adapted for providing an assembly mode area and a connection user interface module. The selected portal resources may be connected by means of the connection user interface module, wherein data fields of the selected and connected portal resources may be mapped selectively to each other for an immediate life navigation using a mapping user interface module resulting in an execution flow path of the connected portal resources.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of embodiments the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the embodiments of the present invention has been presented for purposes of illustration and description, but is not intended to be exhaustive or limited to the invention in the form disclosed. Many modifications and variations will be apparent to those of ordinary skills in the art without departing from the scope and spirit of the invention.

What is claimed is:

1. A method comprising:
providing a web navigational user interface of a portal system, wherein the web navigational user interface includes a graphical modeling tool for selecting portal resources;
causing the web navigation user interface to display a first portal page of a plurality of portal pages in response to a first navigation by a user, wherein the first portal page includes a first set of portal resources;
upon activation of the graphical modeling tool, causing the web navigational user interface to display a defined collection mode area in a top-half portion of the web navigational user interface and to display the first portal page in a bottom-half portion of the web navigational user interface, wherein the defined collection mode area is side by side with the portal resources to be collected, wherein the first portal page, having been actively displayed within the web navigational user interface prior to the activation of the graphical modeling tool, continues to stay actively displayed within the web navigation user interface after the activation of the graphical modeling tool, wherein the graphical modeling tool is activated via a selection by the user;
receiving, via the graphical modeling tool, a first selection of portal resources of the portal system, wherein the first selection of the portal resources is based at least in part on dragging portal resources of the first set of portal resources from the bottom-half portion of the web navigational user interface and dropping the dragged portal resources into the defined collection mode area of the web navigational user interface;
causing the web navigation user interface to display in the bottom-half portion a second portal page of the plurality of portal pages in response to a second navigation by the user, wherein the second portal page includes a second set of portal resources, wherein the first portal page and the second portal page are not displayed at the same time;

receiving, via the graphical modeling tool, a second selection of portal resources of the portal system, wherein the second selection of the portal resources is based at least in part on dragging portal resources of the second set of portal resources from the bottom half portion the web navigational user interface and dropping the dragged portal resources into the defined collection mode area of the web navigational user interface in the top-half portion;

mapping, via the graphical modeling tool, data fields of the first and second selected portal resources to each other using the graphical modeling tool to generate an execution flow path of the selected portal resources; and storing the execution flow path as a portal resource in the portal system.

2. The method of claim 1, wherein the first set of portal resources includes a first set of portlets and a link to the first portal page, and wherein the second set of portal resources includes a second set of portlets and a link to the second portal page.

3. The method according to claim 1, wherein the collection mode area having been actively displayed before the first selection, continues to stay actively displayed during the first and second selection.

4. The method according to claim 1, wherein the method further comprises providing search functionality in an administrator selection user interface for portal resources.

5. The method according to claim 4, wherein in the administrator selection user interface icons of portal resources are selectable.

6. The method according to claim 1, wherein the mapping is performed using a drag-and-drop functionality.

7. A system comprising a display screen, a processor and a memory, the system configured to:

provide a web navigational user interface of a portal system for selecting portal resources, wherein the web navigational user interface includes a graphical modeling tool for selecting portal resources; cause the web navigation user interface to display a first portal page of a plurality of portal pages in response to a first navigation by a user, wherein the first portal page includes a first set of portal resources; upon activation of the graphical modeling tool, cause the web navigational user interface to display a defined collection mode area in a top-half portion of the web navigational user interface and to display the first portal page in a bottom-half portion of the web navigational user interface, wherein the defined collection mode areas is side by side with the portal resources to be collected, wherein the first portal page, having been actively displayed within the web navigational user interface prior to the activation of the graphical modeling tool, continues to stay actively displayed within the web navigational user interface after the activation of the graphical modeling tool, wherein the graphical modeling tool is activated via a selection by the user;

receive, via the graphical modeling tool, a first selection of portal resources of the portal system, wherein the first selection of the portal resources is based at least in part on dragging portal resources of the first set of portal resources from the bottom-half portion of the web navigational user interface and dropping the dragged portal resources into the defined collection mode area of the web navigational user;

cause the web navigation user interface to display in the bottom-half portion a second portal page of the plurality of portal pages in response to a second navigation by the user, wherein the second portal page includes a second set of portal resources, wherein the first portal page and the second portal page are not displayed at the same time;

map, via the graphical modeling tool, data fields of the first and second selected portal resources to each other using the graphical modeling tool to generate an execution flow path of the selected portal resources; and store the execution flow path as a portal resource in the portal system.

8. The system according to claim 7, wherein the first set of portal resources includes a first set of portlets and a link to the first portal page, and wherein the second set of portal resources includes a second set of portlets and a link to the second portal page.

9. The system according to claim 7, wherein the system is further configured to provide search functionality in an administrator selection user interface for portal resources.

10. The system according to claim 9, wherein in the administrator selection user interface icons of portal resources are selectable.

11. The system according to claim 7, wherein the collection mode area having been actively displayed before the first selection, continues to stay actively displayed during the first and second selection.

12. The system according to claim 7, wherein the mapping is performed using a drag-and-drop functionality.

13. A computer program product comprising a computer readable storage medium having program instructions embodied therewith, wherein the computer readable storage medium is not a transitory signal per se, the program instructions executable by a processor to cause the processor to perform a method, comprising:

providing a web navigational user interface of a portal system, wherein the web navigational user interface includes a graphical modeling tool for selecting portal resources;

causing the web navigation user interface to display a first portal page of a plurality of portal pages in response to a first navigation by a user, wherein the first portal page includes a first set of portal resources;

upon activation of the graphical modeling tool, causing the web navigational user interface to display a defined collection mode area in a top-half portion of the web navigational user interface and to display the first portal page in a bottom-half portion of the web navigational user interface, wherein the defined collection mode area is side by side with the portal resources to be collected, wherein the first portal page, having been actively displayed within the web navigational user interface prior to the activation of the graphical modeling tool, continues to stay actively displayed within the web navigation user interface after the activation of the graphical modeling tool, wherein the graphical modeling tool is activated via a selection by the user;

receiving, via the graphical modeling tool, a first selection of portal resources of the portal system, wherein the first selection of the portal resources is based at least in part on dragging portal resources of the first set of portal resources from the bottom-half portion of the web navigational user interface and dropping the dragged portal resources into the defined collection mode area of the web navigational user interface;

causing the web navigation user interface to display in the bottom-half portion a second portal page of the plurality of portal pages in response to a second navigation by the user, wherein the second portal page includes a second set of portal resources, wherein the first portal page and the second portal page are not displayed at the same time;

receiving, via the graphical modeling tool, a second selection of portal resources of the portal system, wherein the second selection of the portal resources is based at least in part on dragging portal resources of the second set of portal resources from the bottom half portion the web navigational user interface and dropping the dragged portal resources into the defined collection mode area of the web navigational user interface in the top-half portion;

mapping, via the graphical modeling tool, data fields of the first and second selected portal resources to each other using the graphical modeling tool to generate an execution flow path of the selected portal resources; and storing the execution flow path as a portal resource in the portal system.

14. The computer program product of claim 13, wherein the first set of portal resources includes a first set of portlets and a link to the first portal page, and wherein the second set of portal resources includes a second set of portlets and a link to the second portal page.

15. The computer program product of claim 13, wherein the system is further configured to provide search functionality in an administrator selection user interface for portal resources.

* * * * *